Nov. 3, 1942.   J. R. PATTEE   2,300,803
METHOD OF MAKING INSTRUMENT SCALES BY PHOTOGRAPHY
Filed Aug. 17, 1939   2 Sheets-Sheet 1
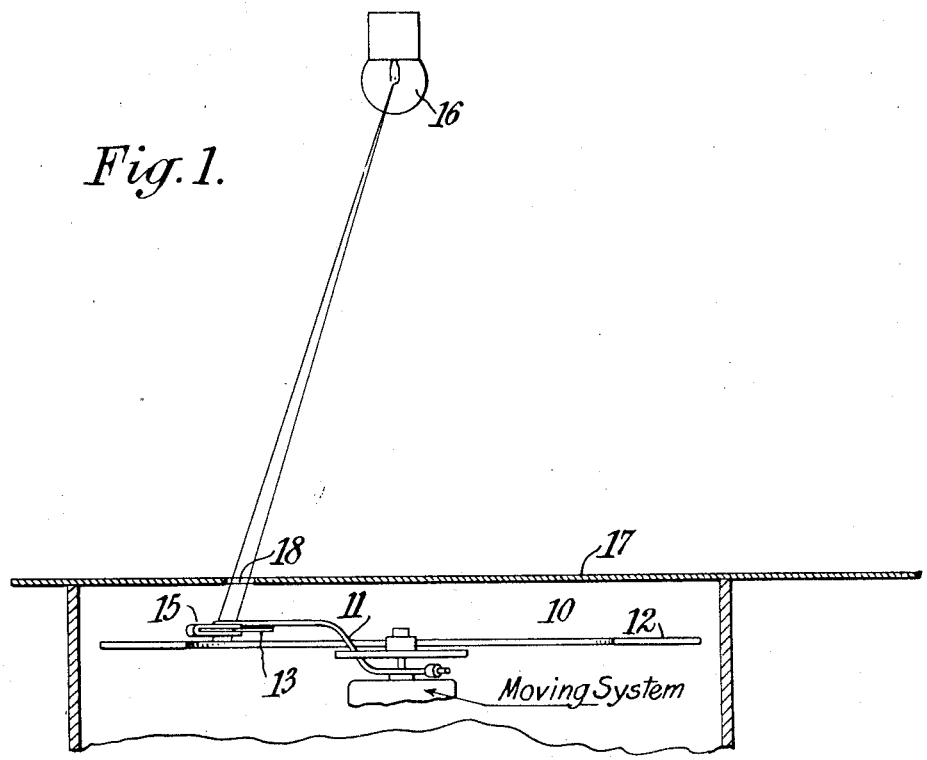
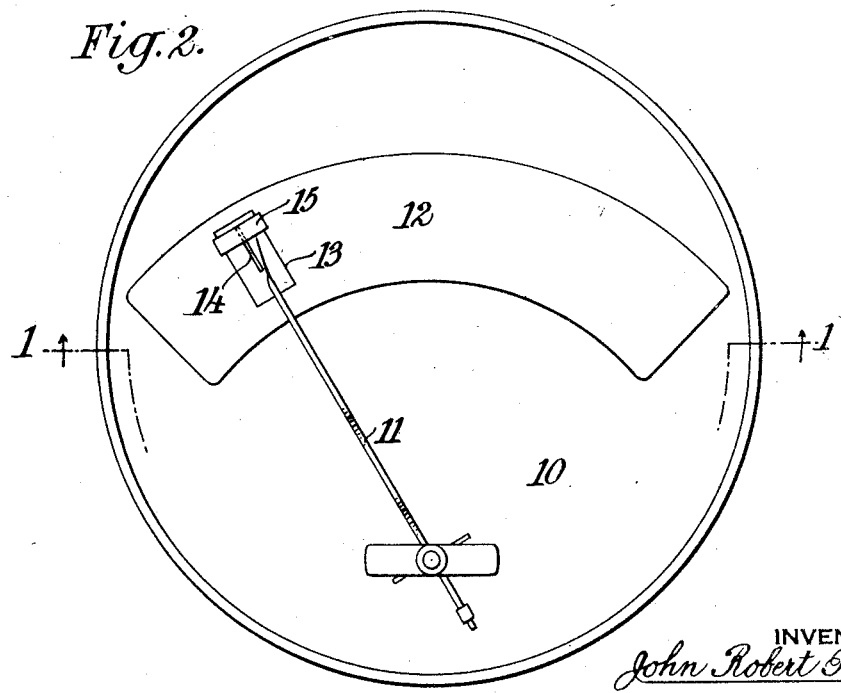
INVENTOR
John Robert Pattee,
BY
Fraser, Myers Manley
ATTORNEYS

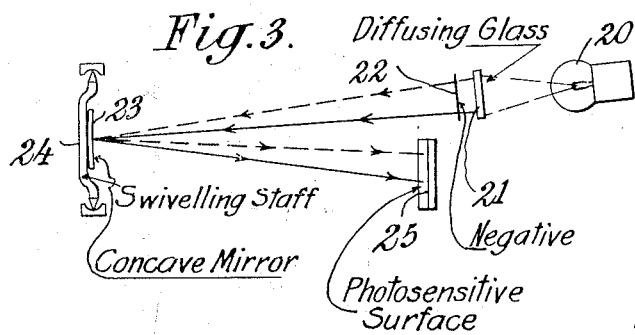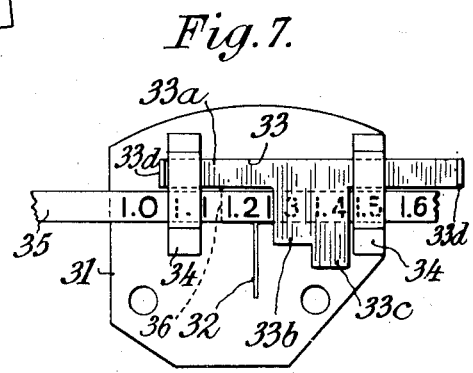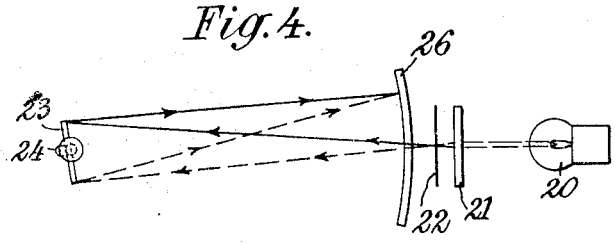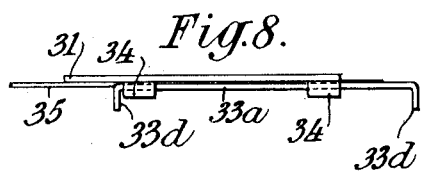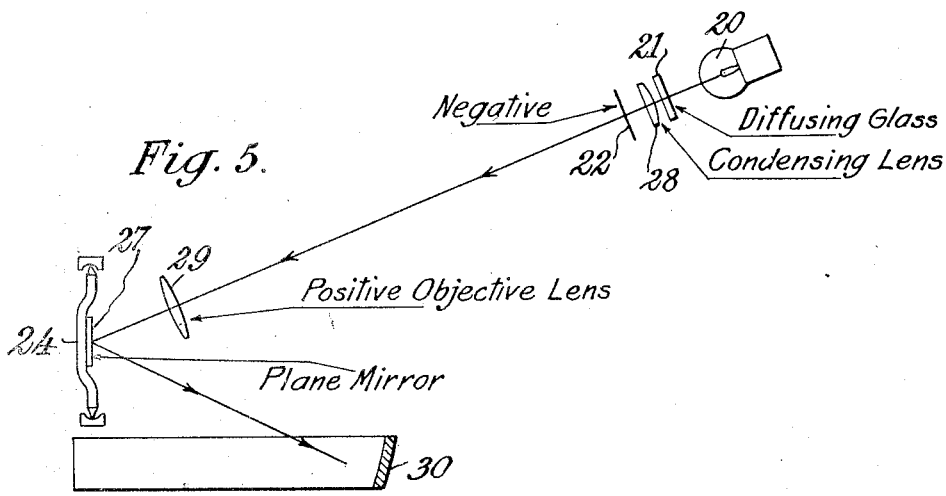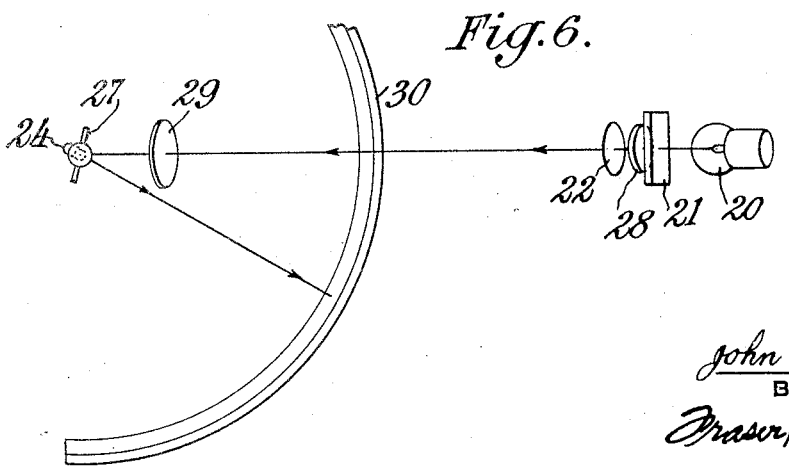

Patented Nov. 3, 1942

2,300,803

UNITED STATES PATENT OFFICE 2,300,803

METHOD OF MAKING INSTRUMENT SCALES BY PHOTOGRAPHY

John Robert Pattee, Essex, Conn., assignor, by mesne assignments, to Thomas A. Edison, Incorporated, West Orange, N. J., a corporation of New Jersey Application August 17, 1939, Serial No. 290,539

12 Claims. (Cl. 73—151)

My present invention relates to the method of and means for making calibrated scales for measuring instruments and aims to provide certain improvements therein.

The usual method of making accurate scales for measuring instruments calibrated against standards is to mark on a blank scale with a pencil or scribe a number of major points obtained by comparison with standards, which points constitute the main divisions of the scale; the minor divisions being filled in by hand between the major points.

Some of the objections to this method are: (1) the observations and markings of the calibrator and the work of the draftsman are subject to error; (2) interpolation of the minor divisions requires judgment and skill, especially if these divisions are not uniform; (3) where a scale is desired which is to be magnified to increase the accuracy of reading, it may have to be too small to be drawn by hand; and (4) the method is laborious and requires considerable skill to produce accuracy and neatness.

The present invention seeks to avoid the aforementioned difficulties and to provide calibrated scales for measuring instruments having a greater degree of accuracy than has been heretofore possible of production.

According to the present invention the scale is calibrated by photography. In producing such scale the scale blank is first coated with a photographic emulsion, and for each division line required, the corresponding quantity is applied to the instrument to deflect it. A beam of light is passed through an optical system, including an element having a narrow slit or small aperture therein, so as to cast an image in the form of a line or other suitable mark upon the scale blank. When this has been done for every calibration point required, with identification numbers also photographed in where desired by the same process, and the scale blank has been developed in the usual manner, the result is a scale the precision of which is not limited to the skill of the scale maker.

The invention and the manner in which it is carried out will be better understood from the detailed description which follows when considered in conjunction with the accompanying drawings, wherein—

Figure 1 is a schematic arrangement of one method of making a calibrated dial scale according to my invention, said figure being taken substantially along the line 1—1 of Fig. 2.

Fig. 2 is a top plan view of the instrument and the means shown in Fig. 1, the shielding screen being however omitted.

Figs. 3 and 4 are a schematic elevation and a plan, respectively, of another embodiment of my invention, applied to the method of making an arcuate scale for an instrument, the moving system of which is adapted to deflect only a few degrees.

Figs. 5 and 6 are arrangements analogous to Figs. 3 and 4 wherein the moving system is adapted to deflect through an arc of substantial magnitude.

Fig. 7 is a rear elevation of a negative for use in conjunction with the present invention.

Fig. 8 is a top plan view of the negative shown in Fig. 7.

Referring first to Figs. 1 and 2 of the drawings, the invention is shown as applied to a deflecting instrument 10 having a pointer 11 forming part of a moving system, said pointer being adapted to move over a flat scale 12 which might be the scale of a voltmeter, ammeter, dial type micrometer or the like. In making the scale for such instrument a small light card 13 with a fine slit 14 therethrough is shown provisionally attached to the pointer, the indicating end of which is temporarily bent to one side so that the slit 13 will be in alignment with the pointer and function as the indicating end thereof. Mounted on the card 13 is an adjustable slider 15 to vary the length of the slit 14 and thereby facilitate making division lines varying in length according to their importance.

To calibrate the scale 12, which is initially blank and coated with a photo-sensitive emulsion, the pointer 11 is made to deflect by subjecting the instrument to the effect of known quantities of whatever the particular instrument is intended to measure. These quantities must correspond to each of the required division lines to be formed on the scale. Each time a known quantity is applied to the instrument the pointer deflects to a certain position and this position is recorded on the photo-sensitive scale blank by the image formed thereon by shining a light through the slit 14. The light may come from a lamp 16 having a concentrated light source relatively far from the scale and preferably on the rotation axis of the moving system of the instrument. The scale is normally completely shielded from the light by an adjustable screen 17, herein shown as disposed directly over the face of the instrument, the said screen having an opening 18 through which the light from the source may reach the slit 14 in the card. The light beam from the source will be permitted to momentarily fall upon the photo-sensitive surface each time the instrument is subjected to a known quantity or value. When the photo-sensitive surface of the scale 12 has been exposed to the requisite number of divisions or markings, the scale as a whole may be removed from the instrument and developed so as to fix the calibrated scale thereon. Of course, where the scale is to be removed from the instrument, the scale and its support will have definite points of reference such as cooperating pins and openings (not shown), to insure replacement of the scale after developing and fixing, to precisely the position which it occupied prior to removal. It will also be understood that in lieu of bending the indicating end of the pointer as shown, said end may be made removable from and replaceable onto the pointer proper.

In the method and means disclosed in Figs. 3 to 6, the instruments disclosed are of the type wherein the moving system carries a rotatable mirror which forms part of an optical projection system. By these means a small, finely graduated scale can be made for viewing in much magnified form and the deflections of the instrument may thus be read with high precision. The optical system employed is much like an ordinary photographic enlarger and consists of a concentrated light source 20, a diffusing lens 21, and a negative 22 having a slit therein through which a line of light may be focused onto the concave mirror 23 mounted on a swiveling staff 24 of the moving system of the instrument and from there reflected onto a photo-sensitive surface 25 on an arcuate scale blank 26.

In Figs. 5 and 6 I have shown the invention as applied to forming an arcuate scale of substantial magnitude. With such scale, in order to avoid stigmatic aberration, a flat mirror 27 is mounted on the swiveling staff 24 and the optical system is supplemented by a condensing lens 28 and a positive objective lens 29. The arcuate scale 30 is provided with a photo-sensitive surface as in Figs. 3 and 4.

In carrying out the invention with respect to types of scales as shown in Figs. 3 to 6, the rotating mirrors 23 and 27 are caused to reflect the beam or pencil of light reaching them through the slit in the negative 22, onto the photo-sensitive arcuate scale blank of the instrument. Preferably this is accomplished without varying the focus of the light from the source 20 to bring the image of the slit in the negative 22 to successive positions on the scale blank as the instrument is successively subjected to various known quantities or values. In making these successive exposures it will be understood that the beam of light is shut off while the instrument is deflecting, and is then flashed on for a fixed time. Any desired form of mechanism may be employed for accomplishing this.

In the carrying out of my invention it is highly desirable that the major divisions of the scale be provided with numerical indicia and that the minor divisions be set off from the major divisions by lines of shorter length. I am enabled to accomplish these results by providing a negative, as shown in Figs. 7 and 8, which consists of a flat element 31 having a slit 32 therein, across which a slide member 33 is adapted to be moved within guideways 34, the slide member 33 having portions of different width 33a, 33b, 33c, which, when brought into overlying relation with the slit 32, varies the length thereof through which light from the source may pass. Also supported by the member 31 and adjustably extending through the guideways 34 is a transparent film or strip 35 having numerical indicia thereon which may be brought into position above the slit 32 whereat the member 31 is formed with a window 36, so that light shining therethrough from the source will form on the photo-sensitive scale blank numerical values corresponding to the major divisions of the scale being formed, simultaneously with the formation of said major division lines. For facilitating adjustment of the slide 33 its ends are offset, as indicated at 33d.

Instrument scales made in accordance with the methods disclosed in Figs. 3 to 6, like that of Figs. 1 and 2 may have to be removed from the instrument and developed to fix the scale markings thereon, after which said scales are replaced within the instrument.

Instrument scales produced in accordance with the present invention, it will be understood, must of necessity be accurate for the particular instrument in which they are calibrated regardless of any peculiarity in the instrument itself. Scales so made are particularly valuable and accurate where the scale divisions are not uniform, for example, where the divisions follow in a logarithmic ratio and permit of ease and accuracy in reading the scale either directly, as in Figs. 1 and 2, or indirectly through mirror reflection, with scales as disclosed in Figs. 3 to 6.

In the foregoing detailed description certain preferred embodiments of my invention have been explained. It is to be understood, however, that the invention is not to be considered as limited to the specific methods herein disclosed or the arrangement of parts employed, since these may be varied within the range of engineering skill without departing from the spirit of the invention. Accordingly, the foregoing disclosure is merely exemplary and is not to be considered as limiting, other than by the scope of the appended claims.

What I claim is:

1. A method of making a calibrated scale for an instrument having a moving system, which comprises providing the instrument with a blank scale having a photo-sensitive surface, applying to the instrument a succession of known quantities of whatever the instrument is intended to measure thereby causing the moving system to successively deflect to points corresponding to said applied known quantities, controlling a light source so that it forms an image on the photo-sensitive surface of the blank scale for each position to which the moving system of the instrument has been deflected by the known quantities applied thereto, and fixing the light-exposed points on the scale.

2. A method of making a calibrated scale for an instrument having a moving system, which comprises providing the instrument with a blank scale having a photo-sensitive surface, applying to the instrument a succession of known quantities of whatever the instrument is intended to measure thereby causing the moving system to successively deflect to points corresponding to said applied known quantities, exposing the photo-sensitive surface of the blank scale to a division-mark image of light for each position to which the moving system of the instrument has been deflected by the known quantities applied thereto, and fixing the light-exposed marks on the scale.

3. A method of making a calibrated scale for an instrument having a moving system, which comprises providing the instrument with a blank scale having a photo-sensitive surface, applying to the instrument a succession of known quantities of whatever the instrument is intended to measure for every calibration point required, thereby causing the moving system to successively deflect to points corresponding to said applied known quantities, selectively controlling through an optical projection system a beam of light so that fine line images of different length will be formed on the photo-sensitive surface of the blank scale to provide the major and minor divisions to which the moving system of the instrument has been deflected by the known quantities applied thereto, and fixing the light-exposed lines of different length on the scale.

4. A method of making a calibrated scale according to claim 2, wherein images of identifying numerical values are selectively formed on the blank scale simultaneously with certain of the division mark images.

5. A method of making a calibrated scale for an instrument having a moving system, which comprises providing the instrument with a blank scale having a photo-sensitive surface in the instrument, applying to the instrument a succession of known quantities of whatever the instrument is intended to measure thereby causing the moving system to successively deflect to points corresponding to said applied known quantities, transmitting light images on the surface of the blank scale in accordance with the respective positions to which the moving system of the instrument has been deflected by the known quantities applied thereto, and fixing the light-exposed images on the scale.

6. A method of making a calibrated scale according to claim 5, wherein the light images are formed by passing light through means carried by the moving system of the instrument.

7. A method of making a calibrated scale according to claim 5, wherein the light images are reflected onto the photo-sensitive scale surface from a mirror carried rotatably by the moving system of the instrument.

8. Calibrating means for a measuring instrument which has a moving system, comprising a photo-sensitive blank scale mounted on said instrument; a source of light; and means operatively interposed between said light source and scale to form an image of light from said source and apply the same onto said scale, said means being operatively associated with the moving system of said instrument to cause each image applied onto said scale to be at a position corresponding to the position assumed by the moving system when the system is subjected to a known quantity of whatever the instrument is intended to measure.

9. The combination according to claim 8, wherein the means which is operatively interposed between the scale and light source includes a member having a fine slit therein and adjustable means for varying the length of said slit through which light from the source may pass.

10. The combination acording to claim 8, wherein the means which is operatively interposed between the scale and light source includes a member having a window opening and a screen adjustable in said opening having identifying characters thereon to be protographed upon the blank scale.

11. Calibrating means for a measuring instrument which has a moving system adapted to deflect in accordance with known quantities applied thereto, comprising a photo-sensitive blank scale mounted on said instrument; a source of light; a negative exposed to said light source for providing a light image to be photographed on said scale; and means controlled by said moving system to cause said light image to be applied onto said scale at a position corresponding to the amount of deflection of the system.

12. Calibrating means for a measuring instrument which has a moving system adapted to deflect in accordance with known quantities applied thereto, comprising a photo-sensitive blank scale mounted on said instrument; a source of light; means exposed to said source to form light images to be photographed on said scale; and a mirror controlled by said moving system for reflecting said light images onto said scale at positions corresponding respectively to the amounts of deflection of the moving system.

JOHN ROBERT PATTEE.